(No Model.) 2 Sheets—Sheet 1.
F. MANNING.
MACHINE FOR DRESSING STONE.
No. 396,044. Patented Jan. 8, 1889.
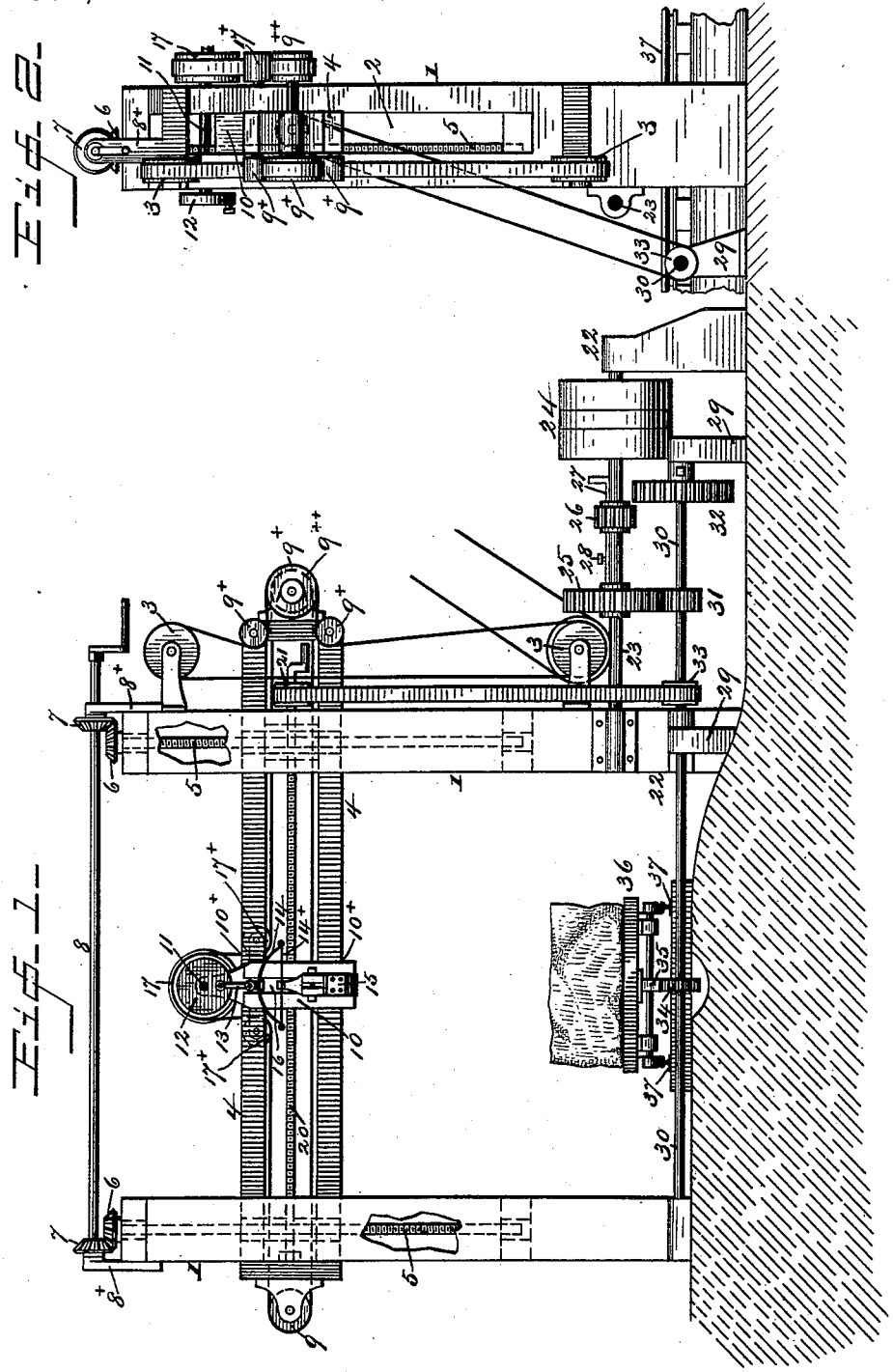

(No Model.) 2 Sheets—Sheet 2.
F. MANNING.
MACHINE FOR DRESSING STONE.
No. 396,044. Patented Jan. 8, 1889.
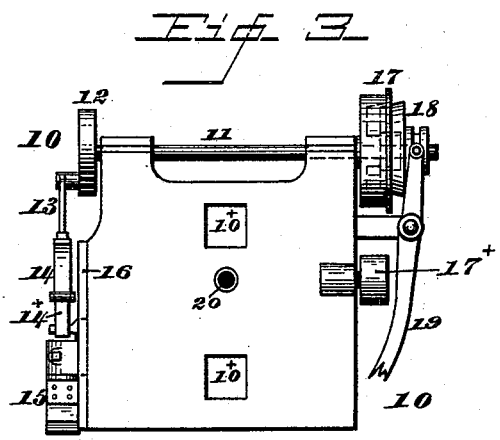
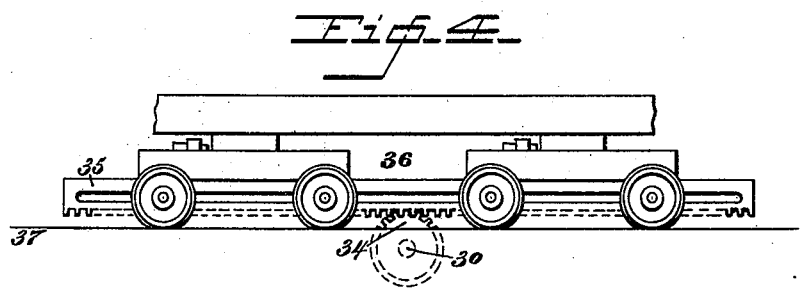
WITNESSES:
L. Douville
Wm. J. Moore
INVENTOR:
Frank Manning
BY Wiedersheim + Kintcher
ATTORNEYS.

UNITED STATES PATENT OFFICE.

FRANK MANNING, OF NARBERTH, PENNSYLVANIA, ASSIGNOR TO THE MANNING MACHINE COMPANY, OF NEW JERSEY.

MACHINE FOR DRESSING STONE.

SPECIFICATION forming part of Letters Patent No. 396,044, dated January 8, 1889.

Application filed July 13, 1888. Serial No. 279,854. (No model.)

*To all whom it may concern:*

Be it known that I, FRANK MANNING, a citizen of the United States, residing at Narberth, in the county of Montgomery, State of Pennsylvania, have invented a new and useful Improvement in Machines for Dressing Stone, which improvement is fully set forth in the following specification and accompanying drawings.

My invention relates to improvements in machines for dressing stone; and the objects of the invention are to provide means for adjusting the carriage carrying the cutters vertically and horizontally, and also for moving the trucks carrying the stone at a right angle to the movement of the carriage while under the action of the cutters, whereby the stone is dressed in a rapid and perfect manner.

A further object is to provide mechanism which will operate the carriage carrying the cutters and also the stone-carrying trucks in such manner that the vertical and horizontal movement of the carriage will operate in combination with the movement of the stone-carrying trucks in order to insure the proper working of the machine.

The invention consists in a carriage carrying cutters and mechanism for imparting to the carriage a horizontal and vertical movement; further, in a carriage carrying cutters, mechanism for operating said cutters, and mechanism for moving the carriage vertically and horizontally; further, in the combination, with a carriage carrying cutters, mechanism for operating said cutters, and mechanism for moving the carriage vertically and horizontally, of a mechanism for moving the stone while under the action of the cutters, said movement being in accordance with the movement of the carriage; further, the invention consists in the details of construction, combination, arrangement, and adaptation of parts for service, as hereinafter described and claimed.

Figure 1 represents a side elevation of a stone-dressing machine embodying my invention. Figs. 2 and 4 represent a side elevation of portions thereof, Fig. 4 being on an enlarged scale. Fig. 3 represents a view of the carriage detached, on an enlarged scale.

Similar numerals of reference indicate corresponding parts in the several figures.

Referring to the drawings, the numeral 1 represents two standards, posts, or uprights, each of which has a vertical passage or slot, 2, therein, and one of said posts carries guide-pulleys 3, as shown. In the passage of slot 2 is adapted to be received a frame, 4, consisting of two horizontal bars connected together and to said frame, which I will term the "carriage-frame," is adapted to be moved vertically in the slotted uprights by means of screws 5, which pass through said frame and at their upper ends carry bevel gear-wheels 6, meshing with bevel gear-wheels 7, and a shaft, 8, having its bearings in short uprights $8^\times$, secured to the slotted uprights. From this construction it is evident that by revolving the shaft 8 motion is imparted to the screws, which engage the frame, causing said frame to move vertically.

The carriage-frame carries at one end the guide-pulley 9, and at the opposite end the guide-pulleys $9^\times$ and driving-pulleys $9^{\times\times}$.

10 represents the carriage, which is provided with openings $10^\times$ to receive the bars of the frame, and journaled in its upper portion is the shaft 11, to one end of which is affixed the crank-wheel 12, to the wrist-pin of which is connected a rod, 13, carrying the spring 14, connected by means of a belt, $14^\times$, with the cutter 15, moving in guides or ways 16 on the carriage. To the opposite end of the shaft 11 is connected a clutch-pulley, 17, and 18 represents the clutch operated by the lever 19 to cause said pulley to revolve the shaft 11 or throw the same out of operation, as desired. The carriage also carries guide-pulleys $17^\times$. Through a screw-threaded opening in the carriage passes the screw 20, which revolves in the slotted post and carries a pulley, 21, adapted to be driven by means hereinafter described for operating the screw and causing the carriage to travel horizontally.

From the foregoing it will be seen that the carriage is capable of a vertical and horizontal travel or movement.

22 represents posts or uprights, in which is mounted a shaft, 23, carrying the driving-pulleys 24 and the gear-wheels 25 and 26, respectively, of different diameters, which gear-wheels are capable of a horizontal or shifting movement in the shaft by means of the connecting-key 27, engaging a keyway in said shaft and having a fastening-screw, 28.

29 represent uprights, in which are mounted a shaft, 30, carrying the gear-wheels 31 and 32, respectively, of different diameters, which are adapted to mesh with the gear-wheels 25 and 26 for imparting different rates of speed to the shaft 30. On the shaft 30 is also a driving-pulley, 33, for driving the screw-operating pulley 21, and said shaft also carries a gear-wheel, 34, engaging a rack, 35, which is connected with the stone-carrying trucks 36, moving on tracks 37.

From the described construction it is evident that the stone-carrying trucks are moved, and also the carriage, by means of the horizontal screw, and also that the said trucks and carriage travel at the proper rate of speed. It will also be seen that by shifting the gear-wheels on the driving-shaft the carriage and trucks may be caused to travel at different rates of speed, as desired, because of the difference in diameters of the meshing gear-wheels.

The operation is as follows: The stone to be dressed is placed upon the trucks and the carriage-frame is adjusted by means of the vertical screws to bring the carriage near the stone, in order that the cutters may operate upon the same. The crank-wheel is then operated through the medium of the driving-belts passing over the pulleys, as shown, causing the cutters to strike the stone with force, the proper stroke being produced by means of the spring. The carriage is moved horizontally by means of the screw passing therethrough, and the stone is caused to travel under the action of the cutter by means of the gear-wheels and rack.

It will thus be seen that a machine constructed and operating as described will dress a stone in a very short time and in a perfect manner.

Having thus described my invention, what I claim as new, and desire to secure by Letters Patent, is—

1. In a stone-dressing machine, the combination of standards or uprights, a carriage-frame carried by said uprights, vertical traveling screws engaging the frame for adjusting said frame vertically, a carriage mounted on said frame, a screw in the frame for causing the carriage to travel transversely, a pulley on said screw, a transverse shaft mounted in the uprights carrying a pinion and pulley, a band passing over the pulleys on the shaft and screw, and a stone-carrying truck provided with a rack adapted to mesh with the pinion on the transverse shaft, said parts being arranged and operating substantially in the manner and for the purpose described.

2. In a stone-dressing machine, the combination of the posts or uprights, the carriage-frame mounted therein, the pulleys carried by the frame, the carriage carrying the cutting mechanism mounted on said frame, the pulleys on the carriage, the belt passing over the pulleys of the carriage-frame and carriage for operating the cutting mechanism, and mechanism in the carriage for throwing the cutting mechanism into and out of operation, substantially in the manner and for the purpose described.

3. In a stone-dressing machine, the combination of the standards or uprights, the vertically-adjustable carriage-frame carrying pulleys, the transversely-traveling carriage mounted on said frame carrying pulleys, the belt passing over the pulleys of the carriage-frame and carriage for operating the cutting mechanism, the transverse shaft mounted in the standards, the gear-wheel on said shaft, and the truck carrying the rack meshing with said gear-wheel, said parts being arranged and operating substantially in the manner and for the purpose described.

4. In a stone-dressing machine, the combination of the standards or uprights, the vertically-adjustable carriage-frame carrying pulleys mounted therein, the carriage mounted in the frame carrying pulleys, pulleys on the standards, a belt passing over the pulleys on the frame and standards and a belt passing over the pulleys on the frame and carriage, a transverse screw in the carriage-frame carrying a pulley, a transverse shaft mounted in the standards carrying a pulley, a belt passing over the pulley of the screw and shaft, a gear-wheel on said shaft, a rack on the stone-carrying trucks meshing with said gear-wheel, differential gearing on said shaft, and a driving-shaft having differential gearing adapted to mesh with the differential gearing of said transverse shaft for imparting different speeds to said shaft, substantially in the manner and for the purpose described.

5. In a stone-dressing machine, the combination of the standards or uprights, the carriage-frame mounted in said standards carrying a single pulley at one end, a double pulley at the opposite end, and guiding-pulleys adjacent to the double pulley, a carriage having cutting mechanism mounted on the frame, pulleys carried by the carriage, a belt passing over the single and double pulleys, and the pulleys on the carriage-frame, operating substantially in the manner and for the purpose described.

FRANK MANNING.

Witnesses:
L. F. McDOWELL,
A. P. McDOWELL.